Dec. 3, 1963  E. J. ALTORFER  3,112,785
BALLAST TIRES
Filed Oct. 20, 1961

INVENTOR:
EDWARD J. ALTORFER
BY
ATT'Y 3,112,785
BALLAST TIRES
Edward J. Altorfer, 4364 Eaglemere Court SE.,
Cedar Rapids, Iowa
Filed Oct. 20, 1961, Ser. No. 146,528
8 Claims. (Cl. 152—313)

This invention relates in general to pneumatic tires and in particular to a ballast material for pneumatic tires and a method for inserting the ballast material into a tire mounted on a vehicle rim.

Placing ballast material inside a tire is a well known and accepted method for obtaining additional traction between the ground and tires of vehicles such as farm tractors, earth moving equipment, and other similar heavy equipment. The ballast material generally consists of water containing calcium chloride. The calcium chloride being added to keep the water from freezing in cold weather and also adds, somewhat, to the weight of the ballast. This solution is normally pumped into the tire and fills approximately 80% of the volume therein with the balance of the volume being filled with air to the desired pressure. Although this significantly increases the pulling power of the unit on which the tire is mounted, it creates certain undesirable effects.

When an all liquid ballast is used in the tires for vehicles of the type previously mentioned, which by their very nature move over uneven terrain, the vertical movements of the vehicles and tires are quite severe. This movement causes the solution within the tires to agitate and move in directions inconsistent with the direction of the vehicle, and therefore reduces the effectiveness of the operation. Another advantage that is well known which leads to use of a ballast material in tires is that if a tire is given better traction there is less loss of motion and thus more production, and the longevity of the tire is greatly increased.

The undesirable movements inconsistent with the direction of the movement of the vehicle, sometimes called "loping," produces surging movements which bring about an unbalanced movement to the vehicle. It being readily understood that such undesirable movements ultimately effect the operation being performed, such as grading, dragging, plowing, etc.

Further, it has generally been necessary when using a liquid ballast, to use an inner tube within the casing to hold the air as well as the liquid. With all the advantages of today's more modern tubeless tire, is is desirable to provide a tire ballast without the utilization of an internal tubing member. It has been found that in most of the prior methods and devices for placing ballast material in heavy equipment tires, the air injected with the ballast material ultimately ends up in the upper portions of the tire with the heavier ballast material on the lower portions of the tire thus reducing the shock absorbing effect of the air and creating a more severe impact to the casing material.

The force of impact to be cushioned on a tire, occurs at the lower portion in contact with the ground. With a liquid within the lower portion of the tire, the force will not be absorbed but transmitted since the liquid is virtually incompressible. It is therefore desirable to have a highly compressible substance within the tire adjacent the point of impact which, understandably led to the development of today's pneumatic tires.

The problem arises when a ballast material is inserted into a pneumatic tire for the purpose of giving the tire additional traction with the ground without losing the desirable shock absorbing features of a fully pneumatic tire.

It is therefore the primary object of this invention to provide an improved ballast material for pneumatic tires which eliminates the shortcomings and disadvantages of prior ballast material of this character.

A specific object of this invention is to provide an improved ballast material for pneumatic tires which provides the desired additional traction with the ground yet retains the effective shock absorbing features of a fully pneumatic tire.

Another object of this invention is to provide an improved ballast material for use in pneumatic tires which completely eliminates the normally experienced side movements and surging movements of pneumatic tires having a conventional liquid ballast therein.

A further object of this invention is to provide an improved ballast material which may be readily inserted into a tire even though the tire is mounted on a vehicle rim.

A still further object of this invention is to provide a new method of inserting a cellular ballast material within a tire that is mounted on a vehicle rim whereby the ballast material does not adhere to the inner side walls of the tire or the rim.

Another object of this invention is to provide an improved ballast material in combination with air and a liquid within a tire to further rigidify the tread of the tire as the speed of the vehicle increases.

A still further object of this invention is to provide an improved ballast material for a pneumatic tire mounted on a vehicle rim which is simple, compact, readily removed upon the need for a tire change and economical to manufacture and install.

Other objects of the invention and advantages will appear from the following description taken in connection with the drawings, in which like numerals refer to like parts throughout the several views in which.

Figure 2:
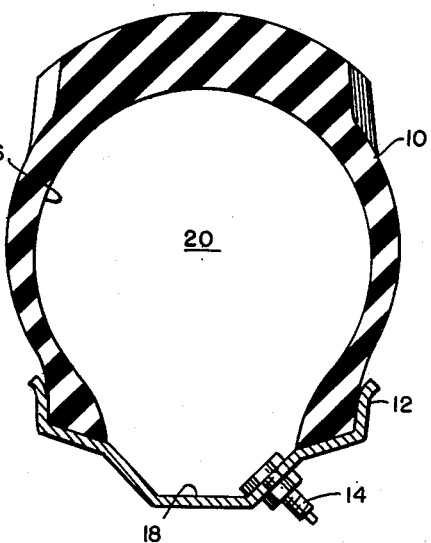
FIG. 2 is a cross-sectional view of a pneumatic tire and vehicle rim upon which the tire is mounted prior to the formation of the ballast material of this invention therein.
Figure 3:
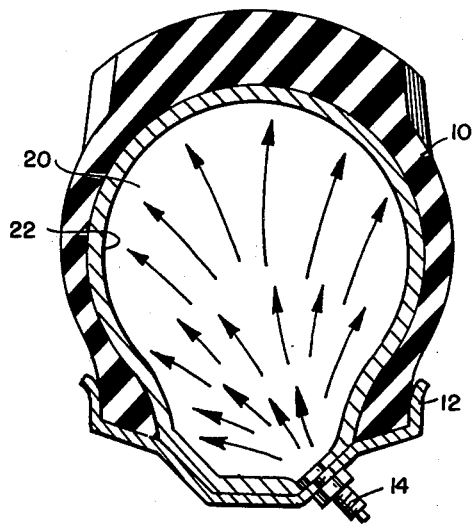
Figure 4:
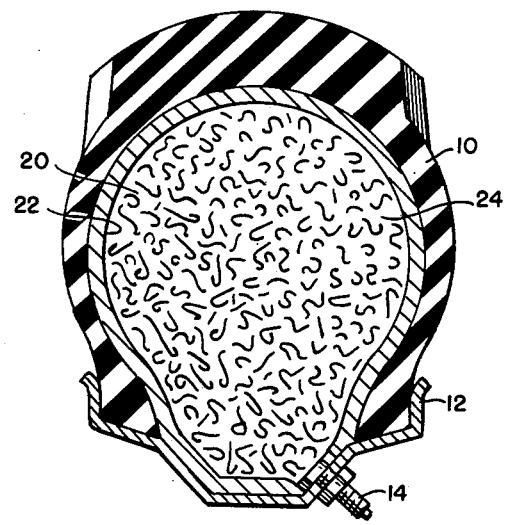

FIG. 3 is a cross-sectional view of the pneumatic tire and vehicle rim, similar to that shown in FIG. 2 illustrating the insertion of the first layer of material within the tire; and FIG. 4 is a cross-sectional view of a pneumatic tire and vehicle rim upon which the tire is mounted, similar to that shown in FIGS. 2 and 3, illustrating the formation of the second portion of the ballast material of this invention within the tire.

By way of generalization, for a better understanding of the detailed description to follow, the ballast material of this invention is primarily characterized by the cellular or multiple cavity structure which maintains a blended liquid and air mixture uniformally dispersed throughout the entire volume of the tire. Another salient feature, which characterizes this invention, is the method of insertion of the ballast material and the combination of the several components in such a manner that the ballast material will not adhere to the inner side walls of the tire or to the exposed rim portion, thus making subsequent tire changes and repairs easily accomplished.

Referring now to the drawings, each view illustrates a portion of a pneumatic tire 10 that has been mounted on a vehicle rim 12 having a conventional filler valve 14 mounted therein for inflation of the tire.

It is to be understood that the pneumatic tire and rim may be of any suitable conventional tire and rim combination and that the ballast material of this invention will function equally as well in a tire requiring the use of an inner tube as in a tubeless tire illustrated in the drawings.

The inside wall 16 of the tire plus the inner wall 18 of the rim 12 forms a cavity 20 within the tire. Conventionally, this cavity 20 is completely filled with air under a pressure of approximately 30 to 40 pounds per square inch. In prior ballasted tires, approximately 80% of the cavity volume is filled with a liquid with the remainder being filled with air under pressure.

Referring now particularly to FIG. 3, a detergent or foaming agent 22 is atomized through the filler valve 14. The detergent 22 may be any suitable liquid detergent that is easily atomized and is dispensed into the cavity 20 until the inside wall 16 of the tire and the inner wall 18 of the rim are completely coated. Most any synthetic detergent such as sold by Colgate Palmolive Co. under the trademark Fab or sold by Procter & Gamble Co. under the trademark Joy will serve as a detergent and also as a foaming agent for the purposes set forth herein. The detergent 22, when deposited on all the inner surfaces of the cavity 20, provides a shield to prevent adherence of an elastic polyurethane material, to be explained in detail, to the walls of the cavity. If the elastic polyurethane material was free to adhere to the inner surfaces of the cavity, removal of the tire from the rim and subsequent repairs of the tire would be virtually impossible.

On completing the coating of the inner surfaces of the cavity with a detergent, a polyurethane elastomer 24 is pumped into the cavity to fill the entire volume therein as best seen in FIG. 4. The polyurethane elastomer is dispensed into and through the filler valve 14 in the form of different chemicals which instantaneously combine to produce a rubbery cellular homogeneous mass containing thousands of uniform cells throughout. A predetermined amount of the chemicals are used to produce just enough of the polyurethane elastomer to fill the entire volume of the cavity 20. The elastomer is homogeneous throughout the entire cavity but will not adhere to the inner side walls of the cavity due to the presence of the detergent 22 as previously explained.

Next, a liquid solution of water, containing calcium chloride, is pumped into the tire, filling approximately 80% of the volume of the cavity with the balance of the volume being filled with air under the desired pressure of approximately 30 to 40 p.s.i. The calcium chloride is mixed with the water to lower the freezing temperature of the water when the ballast material is to be used in sections of the country where freezing temperatures may be experienced.

Figure 1:
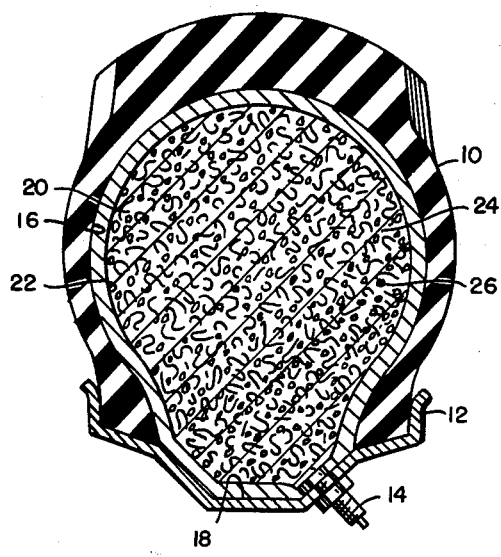
FIG. 1 is a cross-sectional view illustrating the formation and relationship of the components of the ballast material of this invention within a pneumatic tire mounted on a vehicle rim when the vehicle is in operation.

Having inflated the tires with air to the proper pressure, the vehicle is ready for operation. As the vehicle begins to move, the water and air will blend or mix together as they move in, out and through the thousands of cells in the polyurethane to form substantially a foam of thousands of small air bubbles 26 which are evently distributed throughout the cellular structure of the polyurethane, as illustrated in FIG. 1. Thus, it is readily understood, that as the tire rotates, the liquid solution will be uniformly distributed about the entire volume of the tire rather than totally disposed in the lower portion of the tire adjacent the point of impact as found in prior ballasted tires. In like manner, the air under pressure will not be disposed entirely in the upper portion of the tire but is also uniformly dispersed throughout the volume of the tire cavity, thus permitting air to be in the lower portion of the tire adjacent the point of impact of the tire with the ground.

As the tire rolls over a bump, each of the thousands of little liquid entrained air bubbles will be compressed to a certain degree. Each bubble will act as a shock absorber, thus providing a cushioning effect substantially as efficient as a fully pneumatic tire yet the liquid therein adds the necessary weight for the additional traction of the tire to the ground.

It is now readily understood, that by having a completely homogeneous elastic structure containing thousands of liquid air bubbles throughout the entire cavity, the normally experienced "loping" and side movements caused from the sloshing of a solid liquid in conventionally ballast tires, is completely eliminated.

It is further readily understood that as the speed of rotation of the tire increases, the centrifugal force created will cause the water to be separated from the air and flow outwardly towards the outer edge of the cavity with the lighter air being forced inwardly towards the vehicle rim. This outward flow of the liquid, as it reaches the edge of the cavity, will rigidify tread of the tire since it is now backed by a more solid material. This centrifugal force action has definite limits; for instance, it would create negative qualities if used with the high speeds of today's automobiles, but with heavy construction and agricultural equipment, it has been found to be a definite advantage. This advantage is readily apparent in that the need for traction is not as important at increased speeds as at a lower lugging speed. Thus, the ballast material automatically adjusts itself for increased traction at the slower lugging speed and better tire protection at the faster speeds.

The tire may be removed for repair or replacement in any conventional manner with the rubbery polyurethane being removed and reinserted if desired, requiring only subsequent insertion of the liquid and air to the desired pressure.

To further insure total intermixing of the air and water with the cellular mass of polyurethane and sustain a blended condition in the tire for longer periods of time between tire uses, any conventionally known foaming agent may be added to the liquid as it is pumped into the tire. Thus, as the tire rotates and agitates the liquid with the foaming agent and air, a uniform foam will be formed, distributed and sustained for long periods of time throughout the plurality of tiny cells of the polyurethane.

From the foregoing detailed description, it is readily understood by those skilled in the art that an improved ballast material has been provided which is readily inserted into a pneumatic tire. That by utilization of the ballast material as described, a tire maintains a positive shock absorbing characteristic yet sufficiently provides additional weight to improve traction with the ground further. Further, the components and method of application used permits the insertion of the ballast material into the tire without removing the tire from the rim and eliminates any adherence of the ballast material to the inner side wall of the tire or rim.

Although the invention has been described with a certain degree of particularity, it is understood that the present disclosure has been made only by way of example and that many modifications and changes in various details may be resorted to without departing from the spirit and scope of the invention as hereinafter claimed.

What is claimed is:

1. A ballasted vehicle tire comprising a resilient vehicle tire mounted on a rim and having a sealed cavity formed therebetween, a resilient cellular member formed within and confined by the sides of the cavity having minute interconnecting cells, a liquid solution including a foam agent disposed within the cavity and a gas under pressure within the cavity to inflate the tire to the desired pressure, said gas and liquid intermixing to form a homogeneous foam as it circulates through said cellular member upon rotation of the tire.

2. A ballasted vehicle tire comprising a resilient vehicle tire mounted on a rim and having a sealed cavity formed therebetween, a protective coating covering the inner side walls of the cavity, a resilient cellular member formed within the cavity having minute cells, a liquid disposed within the cavity circulating through said cells, a foaming agent disposed within the cavity and a gas under pressure within the cavity to inflate the tire to the desired pressure, said gas, liquid solution and foaming agent intermixing to form a foam as it circulates through said cellular member upon rotation of the tire.

3. A ballasted vehicle tire comprising a resilient vehicle tire mounted on a rim and having a sealed cavity formed therebetween, a layer of detergent covering the inner walls of said cavity, an elastic cellular polyurethane member formed within the cavity, said layer of detergent preventing adherence of the polyurethane to the walls of the cavity, a liquid solution including water and calcium chloride disposed within the cavity occupying 50 to 80% of the volume thereof, a foaming agent and air under pressure within the cavity to inflate the tire to the desired pressure, said air, liquid intermixing to form a foam as it circulates through said cellular member upon rotation of the tire.

4. In combination with a pneumatic tire mounted on a vehicle rim and providing a cavity therebetween, a ballast material for insertion into the tire comprising a cellular member, a liquid solution including a foaming agent and a gas disposed within the cavity filling the volume thereof.

5. In combination with a pneumatic tire mounted on a vehicle rim and providing a cavity therebetween, a ballast material for insertion into the tire comprising a detergent covering the inner walls of the cavity, a resilient cellular polyurethane member confined by the inner walls of the cavity, a liquid solution including water, calcium chloride and a foaming agent filling more than half the volume of the cavity and a gas under pressure within the cavity to inflate the tire, said liquid solution and gas intermixing to form a homogeneous foam throughout the cavity as it circulates through the cellular polyurethane member upon rotation of the tire.

6. A ballasted vehicle tire comprising a resilient vehicle tire mounted on a rim and having a sealed cavity formed therebetween, a liquid disposed within the cavity, a gas under pressure within the cavity to inflate the tire to the desired pressure, and means for blending said liquid and gas in a uniformly dispersed suspension including a flexing cellular member filling said cavity and having minute interconnecting cells through which the water and gas move upon work deflection of said tire during rotation thereof under load.

7. The combination called for in claim 6 in which said liquid comprises a solution of calcium chloride.

8. The combination called for in claim 6 in which said means includes a foaming agent.

References Cited in the file of this patent

UNITED STATES PATENTS

| | | |
|---|---|---|
| 1,436,594 | McClure | Nov. 21, 1922 |
| 1,470,726 | Gratt | Oct. 16, 1923 |
| 1,638,370 | Small | Aug. 9, 1927 |
| 2,045,341 | Bourdon | June 23, 1936 |
| 2,166,511 | Witzenmann | July 18, 1939 |
| 2,556,553 | Pavkov | June 12, 1951 |
| 2,958,907 | Mumford et al. | Nov. 8, 1960 |
| 2,983,963 | Jodell et al. | May 16, 1961 |
| 3,022,810 | Lambe | Feb. 27, 1962 |